United States Patent [19]

Arai et al.

[11] Patent Number: 4,907,315
[45] Date of Patent: Mar. 13, 1990

[54] WIPER ARM OF WINDSHIELD WIPER

[75] Inventors: Masaru Arai; Itsuro Saita, both of Saitama, Japan

[73] Assignee: Nippon Wiperblade Co., Ltd., Saitama, Japan

[21] Appl. No.: 280,724

[22] Filed: Dec. 6, 1988

[30] Foreign Application Priority Data

Dec. 11, 1987 [JP] Japan .......................... 62-187830[U]

[51] Int. Cl.[4] ........................... A47L 1/00; B60S 1/34
[52] U.S. Cl. ................................ 15/250.19; 15/250.35
[58] Field of Search ........... 15/250.19, 250.20, 250.34, 15/250.35

[56] References Cited

U.S. PATENT DOCUMENTS 2,736,053  2/1956  Oishei et al. ................. 15/250.35 X
4,741,068  5/1988  Roth ................................ 15/250.19

Primary Examiner—Harvey C. Hornsby
Assistant Examiner—M. Spisich
Attorney, Agent, or Firm—Wenderoth, Lind & Ponack

[57] ABSTRACT

A wiper arm device of the kind including a rotatable arm head connected to a wiper motor, a retainer rockingly connected to the arm head through a hinge pin, a spring with one end connected to the retainer and the other end connected to a roller pin, and a link supporting the roller pin and being rockable around a pivot shaft which is mounted on the arm head. The link can be forcibly displaced in response to the movement of the wiper arm from the rock-back condition toward the normal operating condition.

3 Claims, 2 Drawing Sheets

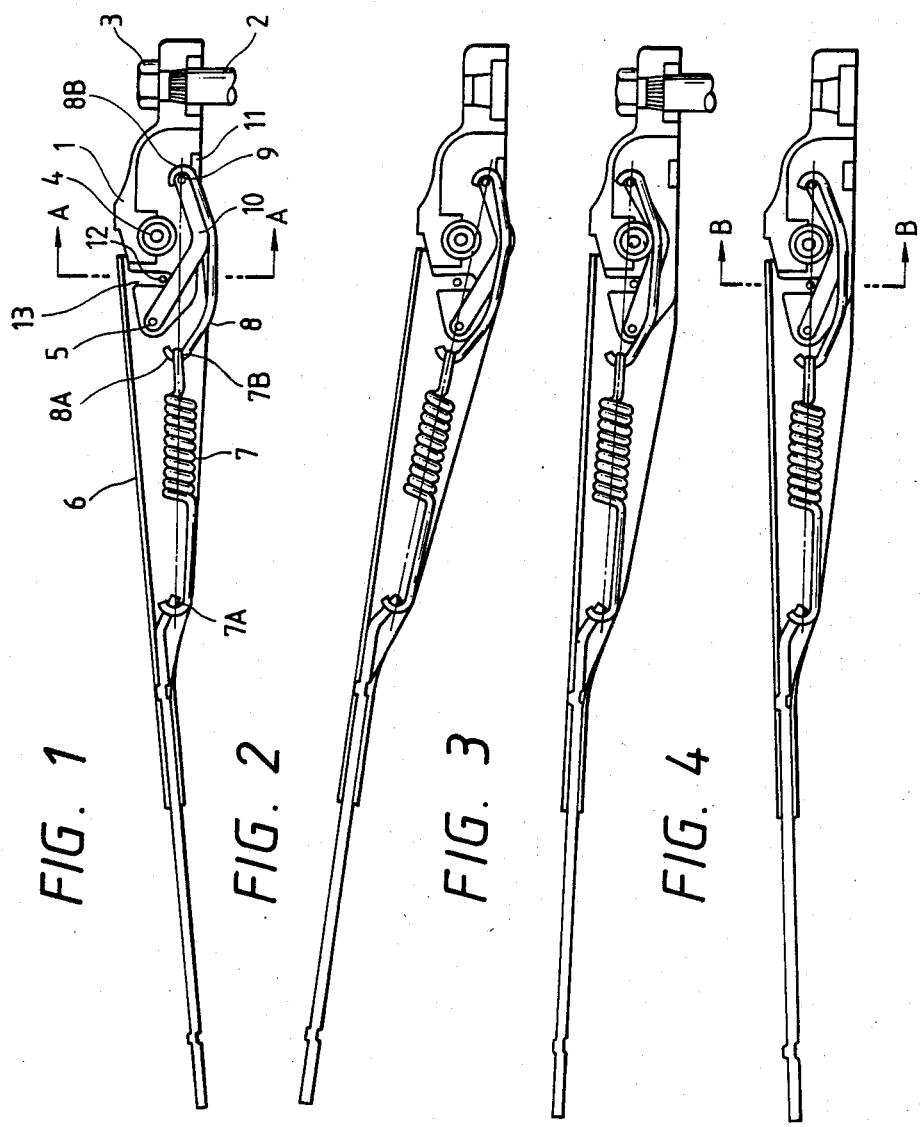

SECTION B-B

SECTION A-A

WIPER ARM OF WINDSHIELD WIPER

FIELD OF THE INVENTION

The present invention relates to a windshield wiper for use in a vehicle such as an automobile and, particularly, to a wiper arm of the windshield wiper which can be moved to a rock-back condition.

DESCRIPTION OF PRIOR ART

Various proposals have been made for enabling a wiper arm to take a so-called rock-back condition whereat a wiperblade connected to the wiper arm is lifted up to separate it from a windshield glass so that the blade rubber of the wiperblade can be protected from sticking to the windshield glass during a long period of non-usage and the wiperblade of the wiper or the windshield glass can be cleaned manually.

A typically prior art device is shown in FIG. 7, which comprises a rotatable arm head 1 connected to a wiper motor (not shown) through a pivot shaft 2 and secured thereto by a nut 3, a retainer 6 rockingly connected to the arm head 1 through a hinge pin 4 and supporting a wiperblade (not shown) on the free end (the left end in the drawing) thereof, a spring 7 with one end 7A being connected to the retainer 6 and the other end 7B being connected to a roller pin 9 through a hook 8, and a link 10 supporting the roller pin 9 and being rockingly supported around a pivot shaft 5 which is secured to the arm head 1. When a straight line connecting the connecting portion 7A between the retainer 6 and the spring 7 with the roller pin 9 passes above the pivot shaft 5, the retainer 6 automatically takes the rockback condition by the force of the spring 7 and, when the line passes below the pivot shaft 5, the retainer 6 is automatically released from the rock-back condition and is urged against the windshield by the force of the spring 7.

The prior art device shown in FIG. 7 is simple in construction and, is easy to move into or release from the rock-back condition. However, there is a problem in determining the critical angle between the normal and the rock-back conditions. Namely, the angle at the rock-back condition is usually large so as to make it easy to move into or release from the rock-back condition, because otherwise, it sometimes is not possible to be released from the rock-back condition. Further, the range of the neutral condition, where the wiper arm does not move either of the normal operating condition or the rock-back condition by the force of the spring, is sometimes expanded due to the abrasion or wear of parts and the like.

The present invention has been made with respect to the circumstances aforementioned, and an object of the invention is to provide a wiper arm having a small rock-back angle, and which enables easy and reliable release from the rock-back condition.

SUMMARY OF THE INVENTION

According to the invention, there is provided a wiper arm device of the kind including a rotatable arm head connected to a wiper motor, a retainer rockingly connected to the arm head through a hinge pin, a spring with one end being connected to the retainer and the other end being connected to a roller pin directly or through a hook, and a link supporting the roller pin and being rockable around a pivot shaft which is mounted on the arm head, in which, there is provided means for displacing the link forcibly in response to the movement of the retainer from the rock-back condition toward the normal condition.

Preferably, the means for displacing the link is a pin secured to the retainer and being displaceable in a groove formed in the arm head.

According to the invention, the link can be forcively displaced, and thus, it is possible to set a relatively small rock-back angle and to provide reliable release from the rock-back condition.

BRIEF DESCRIPTION OF THE DRAWINGS

Further objects and effects of the invention will become apparent from the following detailed description in conjunction with the drawings, in which:

FIG. 1 through FIG. 4 are longitudinal sectional views showing various operating conditions of a wiper arm device according to a preferred embodiment of the present invention, in which;

FIG. 1 shows the normal operating condition;

FIG. 2 shows the condition just before displacing into the rock-back condition;

FIG. 3 shows the rock-back condition;

FIG. 4 shows the condition just before being released from the rock-back condition;

DETAILED DESCRIPTION OF PREFERRED EMBODIMENTS

Figure 6:
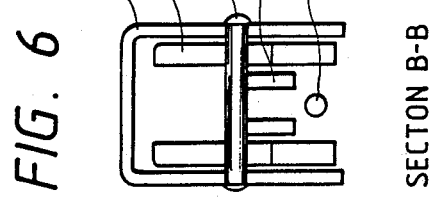
FIG. 6 shows a cross-sectional view taken along line B—B in FIG. 4.
Figure 7:
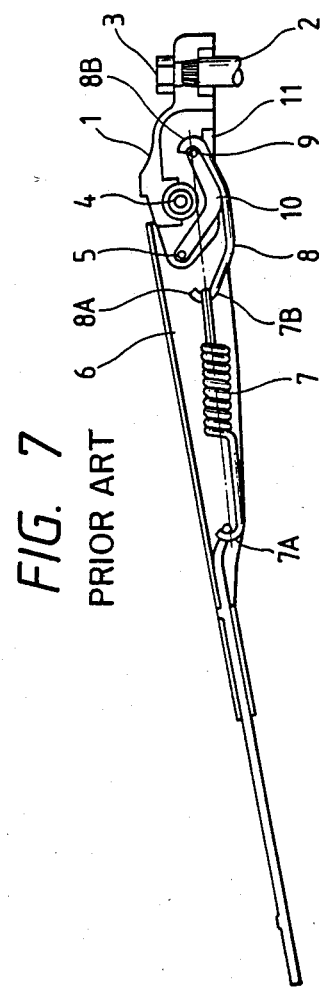
FIG. 7 is a longitudinal sectional view of a wiper arm device of prior art.

In FIG. 1 through FIG. 6, the parts corresponding to those shown in FIG. 7 of prior art are depicted by the same reference numerals.

In the normal operating condition, the wiper arm takes the condition of FIG. 1. And FIG. 2 shows the condition just prior to transfer into the rock-back condition, at which, a straight line connecting the end 7A of the spring 7 with the roller pin 9 passes through the pivot shaft 5. When the wiper arm is lifted from the condition of FIG. 2 by a small amount, the link 10 rotates in the counterclockwise direction around the pivot shaft 5 by the force of the spring 7 so that the roller pin 9 moves upward and the wiper arm takes the rock-back condition as shown in FIG. 3.

For displacing the wiper arm from the rock-back condition of FIG. 3 to the normal condition of FIG. 1, there is provided a pin 12 which is secured to the retainer 6 and is movable in a groove 13 which, in turn, is formed in the arm head 1. In displacing the wiper arm from the rock-back condition of FIG. 3 to the normal operating condition of FIG. 1, the wiper arm or the retainer 6 is moved in the counterclockwise direction around the hinge pin 4 until the pin 12 engages with the link 10 as shown in FIG. 4. Upon further movement of the retainer 6, the link 10 is rotated in the clockwise direction, so that the straight link connecting the end 7A of the spring 7 with the roller pin 9 passes below the pivot shaft 5. The link 10 returns to the condition of FIG. 1 by the force of the spring 7, and the wiper arm returns to the normal operating condition of FIG. 1.

Figure 5:
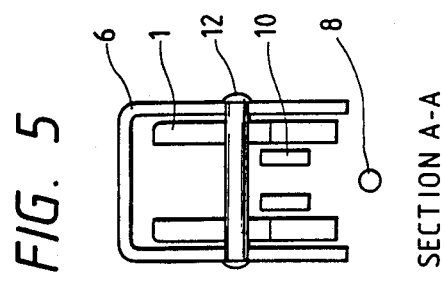
FIG. 5 shows a cross-sectional view taken along line A—A in FIG. 1.

FIG. 5 is a cross-sectional view in the normal condition of FIG. 1, and shows that the link 10 and the hook 8 are spaced from the pin 12.

FIG. 6 is a cross-sectional view showing transferring condition from the rock-back condition of FIG. 3 to the condition of FIG. 4 and, it is clearly shown that the pin 12 is contacting with the link 10.

In the embodiment, the transferring from the rock-back condition to the normal operating condition is performed by moving the retainer 6 in the counter-clockwise direction from the condition of FIG. 3, then, the pin 12 forcively engages and presses down the link 10 as shown in FIG. 4. Then, the link 10 moves jumpingly to the condition of FIG. 1 by the force of the spring 7.

However, the present invention is not limited to the embodiment and, it is possible to replace the pin 12 by any other means which can forcibly move the link 10 from the condition of FIG. 3 to that of FIG. 1 in response to the movement of the retainer 6 from the condition of FIG. 3 toward that of FIG. 1. For example, an independent member may be secured to the retainer 6 to project toward the link 10, with the projecting end being spaced slightly from the link 10 in the rock-back condition, and which engages with and presses down the link 10 in response to the movement of the retainer 6 from the condition of FIG. 3 toward that of FIG. 1.

As described heretofore in detail, the link according to the invention can be forcibly displaced from the rock-back condition toward the normal condition, thus, it is possible to set a relatively small rock-back angle, to provide release from the rock-back condition reliably, to simplify the construction and to reduce the cost.

What is claimed is:

1. A wiper arm device comprising; a rotatable arm head adapted to be connected to a wiper motor, a wiper blade supporting retainer, a hinge pin rockingly connecting said retainer to said arm head for pivoting movement between a normal condition and a rock back condition, a spring having one end connected to said retainer, a roller pin to which the other end of said spring is connected, a link supporting said roller pin, a pivot shaft mounted on said arm head and around which said link is rockable, said arm head having a groove therein, and a pin displacable in said groove when said rtainer is pivoted toward the normal condition for forcibly displacing said link from the rock back condition toward the normal condition.

2. A wiper arm device as claimed in claim 1 in which said pin is secured to said retainer.

3. A wiper arm device comprising; a rotatable arm head adapted to be connected to a wiper motor, a wiper blade supporting retainer, a hinge pin rockingly connecting said retainer to said arm head for pivoting movement between a normal condition and a rock back condition, a spring having one end connected to said retainer, a roller pin to which the other end of said spring is connected, a link supporting said roller pin, a pivot shaft mounted on said arm head and around which said link is rockable, a member secured to said retainer and projecting toward said link and which, when said wiper arm is in the rock back condition, is spaced slightly from said link, and when said wiper arm returns to the normal operating condition said member engages with and forcibly moves said link down in response to the movement of said retainer toward the normal condition.

* * * * *